United States Patent Office 3,296,234
Patented Jan. 3, 1967

3,296,234
AQUEOUS PROCESS FOR POLYMERIZING ACRYLONITRILE IN THE PRESENCE OF SILVER NITRATE AND A HYDROCARBON LIQUID
Raymond J. Ehrig, Barrington, Ill., and Samuel Liebman, Silver Spring, Md., assignors to W. R. Grace & Co., New York, N.Y., a corporation of Connecticut
No Drawing. Filed June 23, 1964, Ser. No. 377,377
1 Claim. (Cl. 260—88.7)

This invention relates to the preparation of acrylonitrile polymers containing a substantial amount of silver ions, polymerized by an aqueous solution of silver nitrate.

In summary, this invention comprises adding a solution of $AgNO_3$ in deoxygenated water (66% wt./wt.) to distilled deoxygenated acrylonitrile at room temperature, under an inert atmosphere, thereby to form polyacrylonitrile. Also, in a preferred embodiment a small quantity of any saturated or unsaturated lower alkyl liquid hydrocarbon can be added to the system to increase the yield.

Metalized films and similar metalized polymeric articles are becoming increasingly important in this electronic age. Shielding for electronic and magnetic equipment, tape for magnetic recording devices, units in radiant heating structures, seat covers for automobiles, the construction of electrolytic condensers and wave guides for microwave applications are only some of the uses for these metalized polymeric articles. If the cost of forming these articles could be reduced and the process of forming them improved, then the market for these materials would be almost limitless.

Heretofore, these metalized articles have been formed using sputtering, vacuum or electroplating techniques. Any method less complicated or less expensive than these has failed to provide adequate adhesion between particle and base material. Even the aforementioned techniques sometimes require a preliminary surface treatment, e.g., mechanical roughening, chemical modification, or so-called freshening for satisfactory results. In some instances, the surface must be heated and, in the case of many metal particles, the prior art processes are a slow, tedious affair.

Metalized articles have also been formed by polymerizing acrylonitrile in the presence of silver salts. However, heretofore it has been necessary to use a polymerization catalyst in addition to the monomer and the salt. Our inventive process needs no catalyst, and therefore provides a very simple method for polymerizing acrylonitrile in the presence of $AgNO_3$.

It is, therefore, an object of this invention to provide a process whereby polyacrylonitrile containing silver ions can be quickly and efficiently produced.

It is a further object of this invention to provide a polymerization process whereby the removal of oxygen from the reaction mixture initiates polymerization without any induction period.

This invention is further described in the following examples.

Example 1

A three-necked flask containing a thermocouple, condenser and gas inlet tube was completely deoxygenated by continual sparging with argon overnight.

A 66% $AgNO_3$ solution in water (weight/weight) had been previously prepared so that 1 ml. of solution contained 1.38 gms. of $AgNO_3$. 18.8 ml. of this solution, previously deoxygenated by bubbling argon therethrough was added to the flask. At room temperature (30° C.), 15.6 gms. of distilled acrylon previously deoxygenated with argon was added by a syringe under an inert atmosphere with stirring. This provided substantially a 0.5/1 $AgNO_3$-acrylonitrile mole ratio. A homogeneous solution resulted, and an immediate exotherm of 15° C. was noted. The mixture became cloudy indicative of insoluble polyacrylonitrile formation. Within 5 minutes white particulate solid was observed. Yield of polymer, which was determined to be polyacrylonitrile, was 0.5 gm. after 6 hours. The polymer was a white, grainy, particulate solid. The entire reaction was conducted under a blanket of argon gas.

A weighed amount of the polymer was chemically treated, before analyzing by emission spectrography. 0.1144 gm. of the polymer was taken in a 150 ml. beaker and destroyed by wet oxidation using 30% $H_2O_2$ and sulfuric acid. The sample was heated to sulfuric acid fumes, cooled and transferred to a 100 ml. volumetric flask. Sufficient yttrium-lanthanum were added as internal standards, and sample was diluted to volume. Emission spectrum obtained, as compared to previously prepared synthetic standards, indicated a silver content of 10.8% by weight in the acrylonitrile polymer.

Example 2

Using the same solution concentrations as in Example 1 but without deoxygenating either the equipment or the solutions, no polymer was observed within a 24 hour reaction time.

Example 3

The equipment and reactants used in Example 1 were used here, except that 15.0 ml. of the 66% $AgNO_3$ solution, and 39.0 ml. of acrylonitrile were used, giving a mole ratio of 0.2 to 1 of $AgNO_3$:acrylonitrile. All equipment and reactants were deoxygenated, and an inert atmosphere was maintained. After 6 hours, a polymer weighing 0.10 gm. was obtained, and emission spectra indicated a silver content of 5.0 weight percent.

Example 4

The same conditions and reagents of Example 1 were used, except that 7.5 ml. of the 66% $AgNO_3$ solution and 39.0 ml. of acrylonitrile were used giving a 0.1:1 mole ratio of $AgNO_3$:acrylonitrile. 0.08 gm. of polymer were obtained after 6 hours, with a silver content of 2.7 weight percent as indicated by emission spectrum data.

It will be noted that we used a maximum $AgNO_3$:acrylonitrile mole ratio of 0.5:1 although a high ratio up to 0.75:1 can be used. Higher ratios, even in an aqueous solution, result in violent exotherms and explosions under deoxygenated conditions. However, since the reaction proceeds more quickly, with the higher ratio, it is preferred to use a $AgNO_3$:acrylonitrile ratio of 0.45–0.75:1. The reaction is operable in the $AgNO_3$:acrylonitrile ratio range of 0.05–0.75:1.

Example 5

Using the same solution concentrations as in Example 1 but adding the aqueous $ANO_3$ solution to the acrylonitrile, no immediate exotherm or cloudiness of the solution was noted. Within five minutes, however, cloudiness was observed and particulate solid was noticed within 30 minutes.

We have also found that if a small quantity of a normally liquid hydrocarbon is added to the water acrylonitrile:$AgNO_3$ system, the yield of polyacrylonitrile is increased greatly. The commonly available alkanes, alkenes, and aryl hydrocarbons are suitable, e.g., 2,2-dimethyl butane, 3-methyl pentane, hexane, 3,3-dimethylpentane, heptane, hexene-1, 4-methylpentene-1, octane, 2,2,4,4-tetra methyl pentane, nonane, decane, benzene, etc. Very little of the hydrocarbon is incorporated onto the polymer; the amount that does graft is so small that it does not modify any physical properties of the polyacrylonitrile. The increased yield is probably due to a partition of the acrylonitrile between the water and hydrocarbon, with a consequent increase of the AgNO₃:acrylonitrile ratio in the aqueous phase. Surprisingly, when this method is used to increase this ratio, a violent exotherm is not observed, and the reaction proceeds without incident.

The operable quantity of hydrocarbon in a 0.05–0.75:1 mole ratio of $AgNO_3$:acrylonitrile mixture is 0.5–1.5 moles, preferably 0.9–1.1 moles.

The chosen amount of hydrocarbon can be added after the acrylonitrile is added to the $AgNO_3$ solution or the hydrocarbon-acrylonitrile mixture can be added together to the $AgNO_3$ solution.

*Example 6*

Using the same equipment and procedure of Example 1, 15.6 gms. of deoxygenated acrylonitrile were added to 18.8 ml. of the 66% $AgNO_3$ solution with stirring. Immediately after this addition 37.5 ml. of deoxygenated hexene-1 were added to the mixture with stirring. Mole ratios of $AgNO_3$:acrylonitrile:hexene-1 were 0.5:1:1.

Temperature was 25° C. and an exotherm of 10° C. was noted. Within 2 minutes particulate solid polymer was observed. After 6 hours a yield of 2.8 gm. was obtained. The polymer was analyzed for silver content using the analytical procedure described in Example 1, and found to contain 31.7% silver. An infra-red spectrophotometric analysis of the polymer showed all the characteristic absorption bands of polyacrylonitrile and also an absorption band at 724 cm.$^{-1}$ characteristic of the n-butyl branch from poly-1-hexene.

*Example 7*

The same quantities and reagents in Example 6 were used, except that none of the reagents or equipment was deoxygenated. No polymer was observed after 24 hours.

The finished polymer containing silver nitrate can be treated so as to change the soluble silver ions to insoluble silver chloride or reduce to silver metal, as is well known in the art. The metallized polymer can be shaped before or after these treatments.

The water is important as a medium for the reaction in order to minimize the effect of what exotherm is caused by polymerization. The operable weight/weight concentration of $AgNO_3$ in water is 50–75 weight percent. These concentrations insure phase homogeneity of the initial reaction mixture at the usual $AgNO_3$-acrylonitrile mole ratio employed.

Initial reaction temperature in the above examples was ambient temperature, as it was found that the reaction proceeded swiftly at 20–30° C. However, temperatures from 10°–60° C. can be used if desired. The reaction appeared to proceed faster at higher temperatures, so care must be taken not to let the reaction get out of control. Conversely, a somewhat sluggish reaction can be anticipated at lower temperatures, although a higher mole ratio of $AgNO_3$:acrylonitrile can be used to compensate.

Although argon was used throughout the reaction to provide an inert atmosphere and to deoxygenate the reactants, any inert or noble gas, such as nitrogen, helium, etc. can be used.

What is claimed is:

The process for polymerizing acrylonitrile which comprises admixing distilled deoxygenated acrylonitrile, a catalyst consisting essentially of a deoxygenated 50–75 weight percent aqueous solution of silver nitrate, in the presence of deoxygenated hexene-1 in a mole ratio of silver nitrate:acrylonitrile:hexene-1 of 0.5:1:1, while stirring under an inert atmospere at ambient temperature, thereby to polymerize the acrylonitrile.

References Cited by the Examiner

UNITED STATES PATENTS

| | | | |
|---|---|---|---|
| 2,473,549 | 6/1949 | Smith | 260—88.7 |
| 2,648,647 | 8/1953 | Stanton et al. | 260—88.7 |

OTHER REFERENCES

Henglein et al.: Chem. Abs. 56, 10385b (1962).
Muhs et al.: J.A.C.S. 84, 4697–4705 (1962).
Kramer et al.: J. Org. Chem. 28, 1029–32 (1963).
Cornish: Die Makr. Chemie 64, 210–212 (1963).
Schnecko: Die Makr. Chemie 66, 19–30 (1963).

JOSEPH L. SCHOFER, *Primary Examiner.*

H. WONG, *Assistant Examiner.*